United States Patent Office 3,365,392
Patented Jan. 23, 1968

3,365,392
LPG-REFORMING PROCESS IN THE PRESENCE OF SULFUR AND CATALYST COMPRISING PLATINUM, ALUMINA AND A MOLECULAR SIEVE
Roy T. Mitsche, Island Lake, and John C. Hayes, Palatine, Ill., assignors to Universal Oil Products Company, Des Plaines, Ill., a corporation of Delaware
No Drawing. Filed June 27, 1966, Ser. No. 560,805
9 Claims. (Cl. 208—138)

ABSTRACT OF THE DISCLOSURE

Catalytic reforming of a gasoline charge stock to produce high octane reformate and LPG by contacting the charge, in admixture with $H_2$ and 10–5000 p.p.m. sulfur, with a catalyst comprising a platinum group metal on a support comprising a finely divided crystalline aluminosilicate suspended in an alumina matrix.

The subject of the present invention is an improved process for the simultaneous production of $C_3$ and $C_4$ hydrocarbons and a high octane reformate. More precisely, the present invention encompasses an improved process for selectively transforming a hydrocarbon charge stock into LPG (i.e. liquefied petroleum gas-chiefly $C_3$ and $C_4$) and a high octane reformate, employing for this purpose a catalytic composite having a finely divide crystalline aluminosilicate suspended in an alumina matrix component and at least one active catalytic component composited therewith, and utilizing a controlled concentration of sulfur in the catalytic environment to balance the hydrogen consumption and production in the conversion zone. The conception of the present invention was facilitated by the recognition that the environment associated with this type of process can be modified and controlled in such a fashion that a substantial hydrogen balancing problem, which is unique to this type of LPG production process, can be essentially eliminated with corresponding increase in the efficiency, effectiveness, and stability of the process. As will be hereinafter explained in detail, the utilization of controlled concentration of sulfur (i.e. chiefly present as hydrogen sulfide) in the catalytic environment of this type of LPG production process has been found to increase hydrogen production and to decrease the rate of carbonacesous deposits on the surface of the catalyst. In essence, then the present invention involves utilization of hydrogen sulfide in a process designed to produce LPG and a high octane reformate in order to balance hydrogen production with hydrogen consumption with a concomitant decrease in the rate of carbonaceous deposits formation on the catalyst, thereby increasing the process stability.

Ordinarily, as is well known in the art, the requirements for an optimum process for transforming low octane stocks into high octane stocks, at minimum loss to undesirable products, involves a specially tailored catalytic environment designed to promote upgrading reactions for paraffins and naphthenes which are the components of gasolines and naphthas that have the highest octane-improving potential. For paraffins the upgrading reactions are: isomerzation, dehydrogenation to olefins, dehydrocyclization to aromatics, and hydrocracking to lower molecular weight paraffins. Of these the dehydrocyclization reaction is the one that shows the maximum gain in the octane number and is, consequently, preferred. For naphthenes, the principal upgrading reactions involve dehydrogenation and ring isomerization of naphthenes to aromatics; but, the improvement in octane number is not as dramatic here as in the case of dehydrocyclization of paraffins since the clear research octane number of most naphthenes is in the range of 65 to 80. Accordingly, catalytic reforming operations are designed to provide an optimum mix between the aforementioned reaction, generally empolying for this purpose a multipurpose catalytic composite having at least a metallic dehydrogenation component and an acid acting component.

It is not, however, to be assumed that the achievement and control of this optimum mix of upgrading reactions is without its problem areas. These, as is true with any complex set of reaction mechanisms, are injected into the picture by the uncontrollable side phenomena that are produced by a myriad of factors that color and complicate the actual operations of such a reforming process. Foremost among these complicating factors are those associated with undesired side reactions. Examples of these side reactiosn are: demethylation of hydrocarbons to produce methane, ring opening of naphthenes to give straight chain hydrocarbons, excessive hydrocracking to yield light gases, condensation of aromatics and other components to form carbonaceous deposits on the catalyst, acid catalyzed polymerization of olefins and other highly reactive components to yield high molecular weight reactants that can undergo further dehydrogenation and thus contribute to the carbonaceous deposits on the catalysts, etc.

Accordingly, a successful reforming operation minimizes the effects of these complicating factors by a judicious selection of the catalytic environment and process variables for the particular charge stock of interest. But, adding an additional dimension of complexity to the solution of this problem is the interdependence of the set of desired reactions and the set of undesired reactions such that selection of the proper conditions to minimize one effect may have, and indeed most likely does, a marked effect on the set of desired reactions.

In a previously filed application (Ser. No. 517,845, filed Dec. 30, 1965) there was disclosed a unique type of reforming catalyst which has the singular characteristic of being able to selectively produce LPG and a high octane reformate with minimum loss to methane and ethane. This remarkable selectivity is apparently a consequence of the increase in the acid function of the catalyst which is brought about by the incorporation of a finely divided crystalline aluminosilicate in the alumina matrix associated with the catalyst. This shift of the mix of reaction towards hydrocracking is not without its associated problems particularly if it is desired to operate the process in a balanced state wherein the hydrogen consumption reactions are balanced by the hydrogen production reactions in order that the supply of hydrogen is maintained without the necessity of adding an extrinsic source of hydrogen.

As mentioned hereinbefore, in a reforming operation a shift in selectivity of the desired reaction is generally accompanied by perturbations in the set of undesired reactions. This interdependence is manifest in the observations we have made utilizing this new catalyst. As will be shown in an example appended to this discussion this LPG-Reforming catalyst does, indeed, shift the set of desired reactions toward selective hydrocracking; but it also tends to increase the carbonaceous deposit formation reaction of condensation, hydrogen elimination, and polymerization.

This increase in carbon deposition is caused, we believe, by a number of factors. The first is that, due to the nature of the catalyst, the rate of carbonium ion production increases. These carbonium ions tend to interact with hydrocarbon molecules to form new higher molecular weight carbonium ions which settle on the catalyst and undergo hydrogen elimination reactions until carbonaceous deposits are formed. The second factor is the high surface area of the catalyst which allows the catalyst to adsorb hydrocarbons, and particularly highly unsaturated hydrocarbons such as aromatics. These adsorbed hydrocarbons tend to concentrate at dehydrogenation sites and actively shield the material being processed from these sites. Moreover, these adsorbed hydrocarbons tend to undergo condensation and hydrogen elimination reaction, thus contributing to the formation of carbonaceous deposits.

In any event these carbonaceous deposits, we have noted, tend to inhibit the dehydrogenation reactions. This decline in dehydrogenation activity tends to shift the hydrogen balance toward the consumption side and net hydrogen production from the process consequently falls. This is doubly serious for the LPG-Reforming type catalyst since it tends to operate with very little net hydrogen production, as contrasted to an ordinary reforming catalyst at similar pressure and temperature, since a large amount of hydrogen is consumed in the additional hydrocracking associated with the LPG production. Accordingly, in order to maintain hydrogen balance it is necessary to compensate for this deactivation. Usually the most direct and inexpensive method of compensating for this involves increasing the reaction temperature. This, in turn, leads to the promotion of undesired hydrocracking to a greater extent than the dehydrogenation reactions. Hence, greater losses to methane and ethane are encountered and hydrogen consumption in a short time goes up. Furthermore, the rate of catalyst fouling increases exponentially as temperature is increased. It is apparent, therefore, that this means of compensation results in undesired temperature and yield stability.

It is to be emphasized at this point that this problem of excessive carbonaceous deposits when operating at pressure in the range of 200 p.s.i.g. to 700 p.s.i.g. is not observed for ordinary reforming catalysts, such as those containing a metallic dehydrogenation component and an acid acting component; but is a problem generated by the selective-hydrocracking-to-LPG function of the LPG-Reforming catalyst as heretofore discussed. It had been thought that this carbon formation with its attendant process temperature instability problem was part of the price that must be paid for the increase in LPG production. We have now found that such is not the case.

We have now discovered, as will be hereinafter explained in detail, that the presence of controlled amounts of hydrogen sulfide in the reaction environment will inhibit the formation of carbonaceous deposits, maintain dehydrogenation activity, and prevent the drift away from hydrogen balance which tends to occur as the LPG-Reforming process is operated for substantial periods of time. As previously explained this carbon formation inhibition will, in addition, greatly increase stability and decrease regeneration frequency for an LPG-Reforming process.

It is accordingly an object of the present invention to provide a mechanism for inhibiting the formation of carbonaceous deposits on LPG-Reforming catalyst during an LPG production operation. A related objective is to provide an LPG-Reforming operation that will be highly stable at pressures of about 200 p.s.i.g. to about 700 p.s.i.g. A corollary objective is to provide an LPG-Reforming operation that can operate without regeneration for a period of time that is comparable to those that are achieved for straight high quality reforming operations at a similar pressure. Still another object is to provide an LPG production process that can be built essentially without expensive regeneration equipment. A further object of this invention is to provide a reasonably stable process for maximizing the yield of LPG in a reforming process without the use of outside hydrogen.

In a broad embodiment, the present invention relates to an improvement in a process for the production of $C_3$ and $C_4$ hydrocarbons and a high octane reformate from a hydrocarbon charge stock wherein said charge stock and hydrogen are contacted, in a conversion zone, with a catalytic composite containing a finely divided crystalline aluminosilicate suspended in an alumina matrix component and having at least one active catalyst component composited therewith, wherein hydrogen-producing reactions are utilized to supply at least a portion of necessary hydrogen for $C_3$ and $C_4$ production reactions, and wherein said hydrogen-producing reactions are inhibited by the formation of carbonaceous deposits on said catalytic composite, the improvement comprising contacting said charge stock, said hydrogen and said catalytic composite with sulfur in an amount of from about 10 p.p.m. to about 5000 p.p.m. by weight of said charge stock.

Specific embodiments of this invention relate to particular preferred process conditions, concentration of catalytic ingredient, types of charge stock, and mechanism of effecting the process. These will be hereinafter discussed in a detailed explanation of the invention which is contained in the description of the elements, conditions, and mechanism that can be employed in the practice of the present invention.

Without limiting the scope and spirit of the appended claims by the following explanation, it appears that the observed activity degradation of the LPG-Reforming catalysts is primarily caused by the deposition of carbonaceous deposits on the catalyst. As such, these deposits actively shield the active sites of the catalyst from the reactants such that the desired heterogeneous reaction on the surface of the catalyst are substantially inhibited. The chemistry of the reactions associated with the formation of these deposits is not at all clear; but, we believe, it is at least in part the result of complex polymerization and condensation reactions that occur between carbonium ions and hydrocarbon molecules. These carbonium ions are generated as necessary intermediates during the hydrocracking and dehydrogenation reactions which are taking place at the active sites of the catalyst. Because of the reaction mechanics, and the high surface area of the catalyst, these carbonium ions tend to be adsorbed on the surface of the catalyst and if they are not removed at a fast enough rate, they tend to act as precursors for the carbonaceous deposit reaction as previously explained. Ordinarily, if the concentration of hydrogen is high enough, relative to the concentration of carbonium ions, these precursors would in a large measure, be removed by cracking, with attendant saturation by hydrogen to smaller paraffinic fragments, or by saturation with hydrogen atoms with intended displacement from the active sites of the catalyst. But when the hydrogen concentration in the reaction environment diminish relative to the concentration of carbonium ion, the beneficial effects of these catalyst-fouling-prevention reactions tends to be reduced also, and the rate of carbonaceous deposit formation increases markedly. We have now discovered that the presence of controlled amounts of hydrogen sulfide in the reaction environment also substantially retards the formation of carbonaceous deposits. And we believe that the hydrogen sulfide, since it is easily adsorbed by the active sites of the catalyst, tends to compete with the coke-precursors for these sites until a situation of dynamic equilibrium develops between the adsorbed hydrogen sulfide and the free hydrogen sulfide in the catalytic environment. We further believe that this hydrogen sulfide adsorption tends to "sweep" the coke precursors off the catalyst because of the greater affinity of the hydrogen sulfide for the active sites and because of the diluent effect of the hydrogen sulfide which is concentrated at the surface of the catalyst. Furthermore, the presence of the hydrogen sulfide in controlled concentration does not appear to substantially effect the dehydrogenation activity of these active sites. Within the context of the present invention, wherein selective cracking to LPG is being maximized, the rate of carbonium ions formation is much greater relative to available hydrogen concentration than in an ordinary reforming operation at the same pressure. Accordingly, the rate of carbonaceous deposit formation is much higher as will be shown in a subsequent example. The present invention by utilizing the beneficial effects of hydrogen sulfide outlined above, retards this rate of carbonaceous deposit formation so that a selective LPG-Reforming process, that has a similar stability to that observed for a high quality reforming process, is realized.

Before considering in detail the various ramifications of the present invention, it is convenient to define several of the conventions, terms, and phrases used in the specification and in the appended claims. In those instances where temperatures are given to boiling ranges and boiling points, it is understood that they have reference to those which are obtained through the use of Standard ASTM distillation methods. The phrase "gasoline boiling range" as used herein refers to a temperature range having an upper limit of about 400° F. to about 425° F. The term "naphtha" refers to a selected fraction of a gasoline boiling range distillate and will generally have an initial boiling point of from about 150° F. to about 250° F. and an end boiling point within the range of about 350° F. to about 450° F. The phrase "hydrocarbon fraction or distillate" is intended to refer to a portion of a petroleum crude oil, the mixture of hydrocarbons, of a coal tar distillate, of a shale oil, etc., that boils within a given temperature range. The expression "in the presence of sulfur" or "in contact with sulfur" refers to the situation where the sulfur is in intimate admixture with the reactants in the conversion zone, and the total quantity given refers to the total amount of sulfur in any form, combined or uncombined, entering the conversion zone from any source. The phrase "reducible sulfur-containing compound" refers to a compound which yields hydrogen sulfide under the conditions prevailing in the conversion zone. The term "selectivity" when it is applied to a LPG-Reforming conversion operation refers to the ability of the process to promote favored LPG production reactions, to promote octane-number-improving reactions, and to inhibit undesired reactions. The term "activity" when it is applied to a conversion operation refers to the ability of the process to produce a product of the required quality. The term "stability" when it is applied to a conversion process referes to the rate of change of the operating parameters associated with the process; for instance, a common measure of stability is the rate of change of reactor temperature that is required to maintain a given quality in output product—the smaller slope implying the more stable process. The phrase "platinum group metallic component" embraces all the members of Group VIII of the Periodic Table having an atomic weight greater than 100 as well as compounds, and mixtures of any of these. The "liquid hourly space velocity" (LHSV) is defined to be the equivalent liquid volume of the reference fluid flowing over the bed of catalyst per hour divided by the volume of catalyst disposed within the reaction zone. The expression "in hydrogen balance" when used in reference to a reforming operation refers to the situation when hydrogen consumption is balanced against hydrogen production with a slight excess of hydrogen being produced which is generally the major component of the "excess recycle gas." The concentrations of sulfur given herein are calculated as weight parts of sulfur per million weight parts of charge stock (p.p.m.); and are reported on the basis of the element sulfur even though the sulfur may be present as a compound.

The hydrocarbon stocks that can be converted in accordance with the process of the present invention comprise hydrocarbon fractions containing naphthenes and paraffins. The preferred stocks are those consisting essentially of naphthenes and paraffins although in some cases aromatic and/or olefins may also be present. This preferred class includes straight run gasolines, natural gasolines, and the like. On the other hand, it frequently is advantageous to charge thermally or catalytically cracked gasolines or higher boiling fractions thereof to the conversion process of the present invention. Mixtures of straight run and cracked gasoline can also be used. The gasoline charge stock may be a full boiling range gasoline having an initial boiling point of from about 50° F. to about 100° F. and an end boiling point within the range of from about 325° to 425° F., or may be a selected fraction thereof which usually will be a higher boiling fraction commonly referred to as a naphtha. It is also possible to charge to the process of the present invention pure hydrocarbons or mixture of hydrocarbons, usually paraffins or naphthenes, which it is desired to convert to aromatics and LPG. As will be demonstrated in an example appended to the present discussion, the process of the present invention is particularly applicable to the conversion of hydrocarbons to LPG.

The charge stock for the process of the present invention must be carefully controlled in the areas of concentration of sulfur-containing compounds. In general it is preferred that the concentration of this constituent be reduced to very low levels; that is less than 10 p.p.m. calculated as elemental sulfur. This is not to be construed to exclude the possibility that the concentration of sulfur-containing compounds could be carefully adjusted in order to furnish the required amount of hydrogen sulfide to the reaction environment; but this latter method is difficult to control and is, consequently, not preferred. These restrictions are doubly significant in a preferred embodiment of the present invention in which the hydrogen gas contained in a effluent from the conversion zone is separated from the other constituents in a high pressure separating zone and is recycled to the conversion zone, because a substantial portion of the hydrogen sulfide from the conversion zone will also be recycled with the hydrogen-rich gas. Accordingly, the concentration of this constituent will tend to build up to an equilibrium level in the recycle stream and small amounts of these materials in the input stream may, if the process is not carefully controlled, build up to substantial levels in the recycle stream.

In general then it is preferred to first reduce the sulfur concentration of the feed to very low levels, and thereafter inject a controlled amount of hydrogen-sulfide-yielding compound. Any reducible sulfur-containing compound, which is converted to hydrogen sulfide by reaction with hydrogen at the conditions in the reforming zone may be used in the process of the present invention. This class includes: aliphatic mercaptans such as ethyl mercaptan, propyl mercaptans, tertiary butyl mercaptan, etc.; aromatic mercaptans such as thiophenol and derivatives; cycloalkane mercaptans such as cyclohexyl mercaptan; aliphatic sulfides such as ethyl sulfide; aromatic sulfides such as phenyl sulfide; aliphatic disulfides such as tertiary butyl disulfide; aromatic disulfides such as phenyl disulfide; dithioacids; thioaldehydes, thioketones; heterocyclic sulfur compounds such as the thiophenes and thiophanes; etc. In addition, free sulfur as hydrogen sulfide may be used if desired. Usually, a mercaptan such a tertiary butyl mercaptan is the preferred additive for reasons of cost and convenience.

The concentration of sulfur that must be present in the conversion zone is a rather complex function of the amount of hydrogen sulfide being recycled in the hydrogen-rich gas, the amount of excess recycle gas being produced, the composition of the charge stock, the hydrogen sulfide adsorption activity of the catalyst, the solubility of hydrogen sulfide in the effluent from the conversion zone, and the reforming process conditions. Considering all of these factors we have found that the total amount of sulfur entering the conversion zone from all sources must be in the range of 10 p.p.m. to about 5000 p.p.m., and preferably in the range of 15 p.p.m. to about 4000 p.p.m., by weight of equivalent sulfur based on the charge stock. Furthermore, we have found that, in the preferred embodiment, in which a substantial portion of the hydrogen gas in the effluent from the conversion zone is recycled to the conversion zone, that the above limitation added to the charge stock in an amount ranging from requires that a reducible sulfur-containing compound be about 10 p.p.m. to about 3000 p.p.m. by weight of equivalent sulfur.

The novel catalysts employed in this invention consist essentially of a component comprising a finely divided crystalline aluminosilicate dispersed in an alumina matrix and at least one catalytic ingredient composited therewith. The dual-function catalysts having halogen activity are the preferred catalytic ingredients to be com- and a metal possessing hydrogenation-dehydrogenation posited with the alumina matrix component and form the preferred catalyst employed in the process of this invention. Especially preferable ingredients are at least one halogen selected from the group consisting of chlorine and fluorine and metals selected from Group VIII of the Periodic Table (platinum group metals being the most preferred). One specific catalysts has been found to be particularly effective containing up to 0.75 wt. percent platinum and up to about 1.0 wt. percent chloride, these ingredients being composited with an alumina component comprising an alumina matrix having less than about 20 wt. percent crystalline aluminosilicate dispersed therein.

The crystalline aluminosilicates are composed of $SiO_4$ and $AlO_4$ tetrahedra, a silicon or aluminum atom being centered around 4 oxygen atoms in the tetrahedra and the oxygens being shared with other surrounding tetrahedra. These aluminosilicates are geometrically arranged to form a pore structure having sufficiently large pore mouths to permit the reactant molecules to pass into said pore structure. Preferably the aluminosilicates employed in the catalyst support have pore mouths of from about 5 up to about 15 Angstroms in cross-sectional diameter. The aluminosilicates are treated to improve their catalytic activity by techniques such as ion-exchange with suitable cations and thermal treatment. Ordinarily, the aluminosilicates are synthetically prepared in the alkali metal form (usually sodium) and there is one monovalent alkali metal cation associated with each aluminum centered tetrahedra (to maintain electrical neutrality). The aluminosilicates may be ion-exchanged with polyvalent cations such as calcium, magnesium, beryllium, rare earths, etc., to replace a substantial amount of the monovalent cations. This causes one polyvalent cation to be associated with more than one aluminum centered tetrahedra and if these tetrahedra are spread sufficiently far apart (due to the presence of silicon centered tetrahedra), areas of local electrical charge will be formed which aid in promoting catalytic reactions. Another treating technique to improve the catalytic activity of the aluminosilicates is to ion-exchange with ammonium ions followed by thermal treatment, preferably above 300° C. to convert the crystalline aluminosilicate to the hydrogen form.

There are numerous types of crystalline aluminosilicates, both synthetic and natural occurring. It is preferable that the pore mouths of the crystalline aluminosilicates have a cross-sectional diameter of from about 5 to about 15 Angstrom units. Among the preferable crystalline aluminasilicates that are suitable are the hydrogen and/or polyvalent forms of faujasite, and mordenite, especially preferable is the hydrogen form of mordenite. The preparation of these novel catalysts is described in Roy T. Mitsche's patent application entitled "Improved Catalyst," Ser. No. 517,845, filed Dec. 30, 1965, and the teachings of that application are hereby incorporated into this present application.

The concentration of crystalline aluminosilicate in the alumino matrix is preferably less than about 20 wt. percent of the alumina although in some cases greater concentrations may also be suitable. We especially prefer concentrations of aluminosilicate of about 10 wt. percent or less. The preferable concentration of Group VIII metal depends to a large extent on the metal. When employing platinum group metals such as platinum, the concentration on the catalyst is preferably from about 0.05 up to about 5 wt. percent; whereas, in the case of non-noble metals such as nickel, preferable concentration ranges are from 1 up to as much as 40 wt. percent. The halogen content of the catalyst is less critical since the crystalline aluminosilicate provides a similar type of catalytic activity. Chlorine is the preferred halogen and may be present in the catalyst in concentrations up to as high as 3.0 wt. percent although lower values of from 0.2 up to about 1.0 wt. percent are preferred. It is to be noted that by suitable variation in the type of crystalline aluminosilicate, its form (hydrogen, divalent) and its concentration in the alumina matrix it is possible to substantially eliminate the necessity of any halogen as a catalytic ingredient.

Hydrocarbons may be converted in accordance with our process using fluidized, fluidized-fixed bed processes, suspensoid, moving bed or batch type of processes. However, we prefer fixed bed processes primarily because operations of this type tend to minimize attrition losses of the relatively expensive catalyst. One fixed-bed method of utilizing the process comprises preheating hydrogen-rich gas and hydrocarbon charge stock to conversion temperature, and passing the same in admixture with a sulfur-containing compound through a plurality of substantially adiabatic reaction zones containing a catalyst of the type described herein. The sulfur-containing compound may be added continuously or intermittently. The sulfur-containing compound may be added to the reaction zone at the inlet of the catalyst; it may be added at a point downstream of the inlet to the reaction, or where several reactors are used, it may be introduced to the first reactor or to any other one of the reactors, or it may be introduced to several of the reactors, or at several points in the same reaction zone. The product hydrocarbons are recovered and a hydrogen-rich gas is separated and recycled to the reaction zone. It is within the scope of this invention to introduce the sulfur-containing compound into this hydrogen-rich recycle gas and in processes wherein the hydrogen-rich gas is introduced from an extraneous source, it is within the scope of this invention to introduce the sulfur-containing compound into this hydrogen-rich gas stream.

Usually the most convenient way of adding the sulfur-containing compound to the conversion zone is to commingle it with the hydrocarbon charge stock passing thereto. Another method is to add it to the conversion zone independently of the charging stock but at the same time the hydrocarbon is being reacted as hereinbefore mentioned.

The temperature at which the present process is carried out will vary somewhat depending on the exact composition of the catalyst employed, the nature of the charge stock, and the accumulated hours of use for the catalyst. However, it can be generally stated that suitable temperatures for the process of the present invention are within the range of about 800° F. to about 1100° F., and preferably in the range of 850° F. to about 1000° F.

Pressures suitable for use in the process of the present invention are within the range of about 200 p.s.i.g. to about 700 p.s.i.g., with the range of about 300 p.s.i.g. to about 650 p.s.i.g. yielding improved results.

Likewise, a liquid hourly space velocity of from about 0.5 to about 5, and a hydrogen to oil mol ratio of from about 2 to about 20 are suitable for use in the present invention.

It is to be kept in mind that the exact selection of the particular setting of all of the variables of this process are at least partially dependent on the physical and/or chemical characteristics of the charge stock being subjected to the present process and, as such, have to be individually determined for each particular type of input stream.

The following examples are given to illustrate further the process of the present invention, and to indicate the benefits to be afforded through the utilization thereof. It is understood that the examples are given for the sole purpose of illustration, and are not considered to limit the generally broad scope and spirit of the appended claims.

*Example I*

This example demonstrates that there is a significant carbonaceous deposit formation problem associated with the use of LPG-reforming catalysts of the type disclosed herein relative to the rate of carbonaceous deposit formation observed for a high quality reforming catalyst at the same conditions.

High purity aluminum metal was digested in hydrochloric acid to produce a sol having a weight ratio of Al/Cl of about 1.40 and a specific gravity at 60° F. of 1.4030. Two liters of this sol were blended with 150.6 cc. of concentrated hydrochloric acid, and the specific gravity of the resultant solution was adjusted with water to a value of 1.3450. The Al/Cl ratio at this point was 1.15. This solution was then aged for three days.

An aqueous solution containing 28% by weight of hexamethylenetetramine (HMT) was then prepared and two 700 cc. portions of this HMT solution was added to two 700 cc. portions of the aluminum sol. The resulting solutions are designated as A and B. About 10 grams of the hydrogen form of mordenite, in the form of a fine powder, was added to solution A and thoroughly dispersed therein. In the same manner 20 grams of the hydrogen form of mordenite was added to solution B.

The mordenite used was analyzed and found to have the following compositions: 11.6% by weight $Al_2O_3$, 87.7% by weight $SiO_2$, 0.21% by weight Na, and between 0.01% to 0.04% by weight of Ca.

The resultant solutions were separately passed through a vibrating dropping head and dropped in discrete particles into a forming oil maintained at 95° C. The rate of vibration and the volumetric flow of alumina sol was set to produce finished spherical particles of about 1/16 inch in diameter. The dropped particles were then aged in oil at 95° C. for 21 hours and then separated from the oil and aged in a 2% $NH_3$ solution at 95° C. for 3 hours. The aged spherical particles were then water washed at 95° C. for 4 hours to remove neutralization salts. The particles were then oven dried and calcined at 600° C. for 4 hours.

About 350 cc. of each type of the resulting particles werep laced in separate vessels. An impregnating solution containing chloroplatinic acid and hydrochloric acid was added to each vessel and the resultant mixture was heated until all of the solution evaporated. The resultant particles were then oxidized to produce a finished product having a wt. percent platinum content of 0.75 and a wt. percent chloride content of 0.75. The particles resulting from solution A are designated as catalyst A and the particles resulting from solution B are designated as catalyst B in the subsequent discussion. It is to be noted that catalyst A contained about 5% by weight of alumina of mordenite and that catalyst B contained about 10% on the same basis. Catalyst B was then prereduced and presulfided with the result that 0.12% by weight of sulfur was incorporated therein.

A third catalyst was prepared in exactly the same manner as above except for the inclusion of the mordenite in the alumina, and contained 0.09% by weight of chloride, and about 0.75% by weight of platinum. This catalyst is designated as catalyst C in the subsequent discussion and is representative of a high quality reforming catalyst.

Catalysts A, B, and C were then separately subjected to an identical high stress evaluation test. This consisted of charging, for the same period of time for each catalyst, a light naphtha having: an initial boiling point of 255° F., an end boiling point of 380° F., a 59.3° API specific gravity, a paraffin content of 81% by volume, a naphthene content of 16% by volume, and an aromatic content of 3% by volume, to a block type of isothermal reactor. This reactor was part of a plant which also included a high pressure separating zone, a debutanizer fractionating column, a recycle separator gas compressor, a charge pump and miscellaneous equipment. In this plant the charge and a recycle hydrogen stream were passed through the reactor, into separating zone, wherein a gas phase separated from a liquid phase. A portion of this gas phase was then recycled to the reactor zone to supply hydrogen thereto and another portion was recovered as excess recycle gas. The liquid phase from the separating zone was introduced into a debutanizer column and an overhead fraction recovered along with the $C_5+$ bottom fraction.

The conditions maintained in each of the runs were: an LHSV of 2.0, a pressure of 500 p.s.i.g., a temperature of about 900° F., and a hydrogen to oil mol ratio of about 10. The results of this series of runs are given in Table I.

TABLE I.—RESULTS OF CATALYST COMPRESSION RUNS

| Catalyst | A | B | C |
|---|---|---|---|
| Excess Recycle Gas, s.c.f.b | 147 | 152 | 974 |
| Mol Percent $H_2$ in Excess Recycle Gas | 56.4 | 50.1 | 73.6 |
| Debutanizer Overhead Gas, s.c.f.b | 931.7 | 991.5 | 456 |
| Mol Percent of $C_3$ and $C_4$ in Debutanizer Gas | 75.5 | 73.2 | 71.9 |
| Octane Number | 96.9 | 97.9 | 96.9 |
| $C_5+$ Yield, Vol. Percent of Change | 51.8 | 50.3 | 67.4 |
| Wt. Percent Carbon Deposited | 1.70 | 2.31 | 0.49 |
| LPG, Wt. Percent of Product | 39.8 | 40.6 | 20.3 |

From Table I the following observations can be made:

(A) The incorporation of mordenite in the catalyst caused the excess recycle gas and its purity to drop drastically. In fact, it was just enough to barely maintain plant pressure. This drop in excess recycle gas from about 974 s.c.f.b. to about 150 is a clear manifestation of the substantial hydrogen balancing problem which was discussed in detail hereinbefore.

(B) The results were reversed for the debutanizer gas inasmuch as it increased by a factor of about two for the LPG-Reforming catalysts (i.e. catalyst A and B). This clearly evidenced the substantial LPG production capabilities of this type of catalyst.

(C) Reformate yield (i.e. $C_5+$ yield), as would be expected, dropped sharply for the LPG catalysts.

(D) LPG production increased by a factor of two.

(E) Carbonaceous deposition increased by a factor of between 3 and 5, as would be expected from the previous discussion.

Hence, this example highlights the significant advantage of this mordenite type catalyst; on the other hand, it also clearly manifests the attendant problems of hydrogen balancing and rate of carbonaceous deposit formation.

Example II

This example evidenced the tendency towards instability in hydrogen production which is observed when an LPG-Reforming catalyst is operated for significant periods.

An LPG-Reforming catalyst containing about 4.6% of hydrogen form of mordenite by weight of the alumina which was manufactured in exactly the same manner as delineated in Example I. The finished catalyst also contained 0.83 wt. percent platinum, 0.76 wt. percent chloride, and 0.11 wt. percent sulfur.

A block type of reactor was loaded with 100 cc. of the catalyst and a light Kuwait naphtha having an initial boiling point of 172° F., an end boiling point of 362° F., a 62.0° API specific gravity of 60° F., a paraffin content of 75% by volume, a naphthene content of 16.0% by volume, and an aromatic content of 9.0% by volume, was then charged to the reactor.

11

The flow scheme of the plant was identical to that outlined in Example I. The plant was operated until the catalyst had accumulated about 8.6 barrels of charge per pound of catalyst (b.p.p.) at which point the run was shut down due to deactivation of the catalyst and to a drop in hydrogen production.

The operating conditions were: an LHSV of 2.0, a pressure of 600 p.s.i.g., a gas to oil mole ratio of 6.0. The temperature was continuously adjusted during the run in order to make a reformate having a research clear octane number of 95.0.

Hydrogen production during the run averaged 200 s.c.f.b. with a peak at 6 b.p.p. of about 215 s.c.f.b. However, hydrogen production was dropping rapidly at the end—it had dropped from 215 at 6 b.p.p. to about 185 at run termination.

Temperature deactivation was about 5° F./b.p.p. which was quite severe and caused the run to abort at about 995° F.

After run termination the catalyst was recovered and analyzed for carbon content. Approximately 12.9% by weight of carbon was found.

The run then evidences the severe hydrogen production problem and temperature instability which attends the build-up of carbonaceous deposits on the LPG-Reforming catalyst. It is to be noted that these problems manifest themselves at conditions at which an ordinary reforming operation would be quite stable; consequently, it can be concluded that these are problems which are unique to this type of catalyst as detailed hereinbefore.

*Example III*

This example shows the substantial improvement associated with the present invention, especially as it exhibits itself in solving the hydrogen balance and carbonaceous deposit formation problems which are particularly acute for the LPG-Reforming catalyst associated with this invention.

The catalyst employed in this example was manufactured according to the method delineated in Example I in such a fashion that it had the following composition based on weight of total catalysis: 10% H-form of mordenite, 0.75% combined chloride, and 0.60% platinum. The catalyst was also prereduced and presulfided before being used in the runs reported herein. This was done on a portion of the above catalyst, called henceforth catalyst D, with the result that 0.50% by weight of sulfur was composited therewith. Another portion of this catalyst, called in the following discussion catalyst E, was presulfided with the result that 0.08% by weight sulfur was composited therewith.

One run was made for each of the above catalysts in a plant that had a flow scheme identical to the one outlined in Example I with the exception that high surface area scrubbers were added to the recycle line in order to more easily control the rate of sulfur injection into the conversion zone.

The plant was operated at the following conditions: an LHSV of 1.5, a recycle gas to oil mol ratio of 8.0, and a plant pressure of 600 p.s.i.g. The reactor temperature was adjusted to produce about 0.05 s.c.f.b. of excess recycle gas per hour. This last condition was necessitated by the desire to maintain hydrogen production during the runs.

The charge to the plant was a light Kuwait naphtha having an initial boiling point of 172° F., an end boiling point of 362° F., a 62.0° API specific gravity at 60° F., a paraffin content of 75% by volume, a naphthene content of 16.0% by volume, and an aromatic content of 9.0% by volume. To the portion of the charge that was used during the evaluation of catalyst D, 300 p.p.m. of sulfur was added in the form of tertiary butyl mercaptan.

The results of a similar 12 hour test period for each catalyst are given in Table II.

12

TABLE II.—RESULTS OF SULFUR INVESTIGATION

|  | Catalyst D | Catalyst E |
|---|---|---|
| P.p.m. Sulfur in Feed | 300 | 0 |
| Octane Number | 102.2 | 103.3 |
| Wt. Percent $H_2$ Produced | 0.13 | 0.10 |
| Wt. Percent LPG Produced | 46.3 | 42.7 |
| Wt. Percent $C_5$+ | 45.1 | 49.3 |
| Block Temperature, ° F | 959 | 979 |
| Vol. p.p.m. S in ERG | 71 | 42 |
| $H_2$ s.c.f.b. | 57 | 44 |
| Excess Recycle Gas (ERG), s.c.f.b. | 103 | 64 |
| Debutanizer Gas, s.c.f.b. | 1,178 | 1,034 |

These results indicate: that the line out temperature of the plant increased as the sulfur level in the feed (or in the ERG) decreased when the plant was operated to stay in hydrogen balance; that the hydrogen make for the sulfur run was significantly higher; that the total excess recycle gas also increased for the sulfur case; and that LPG production was also enhanced. It is to be noted that the catalyst E run was not completely free from sulfur because of the fact that it followed the sulfur run and, despite extraordinary clean-up efforts, there was still significant amounts of sulfur entrapped in the plant. Consequently, a lower sulfur level run would be expected to exhibit an even greater contrast with the sulfur run.

The catalyst D run was continued for a total of 116 hours at which point the run was shut down. Carbon analysis on the spent catalyst showed a 3.16% by weight level of carbon deposition. In sharp contrast with this result, the catalyst E run was shut down at 52 hours and a carbon level of 4.02% by weight was found. Inasmuch as the former run was twice as long as the latter run, this composition indicates a marked reduction in the rate of carbonaceous deposits for the process of the present invention.

This example then manifests the benefits of increased hydrogen production, lower temperature requirements, and lower rate of carbonaceous deposit formation, which are extraordinary features of the present invention.

We claim as our invention:

1. In a process for the production of $C_3$ and $C_4$ hydrocarbons and a high octane reformate from a gasoline boiling range hydrocarbon charge stock containing paraffins and naphthenes wherein said charge stock and hydrogen are contacted, in a conversion zone and at reforming conditions including a temperature of from about 800° F. to about 1100° F., with a catalytic composite containing a finely divided crystalline aluminosilicate suspended in an alumina matrix component and having a platinum group metal or compound thereof composited therewith, wherein hydrogen-producing reactions are utilized to supply at least a portion of the necessary hydrogen for the $C_3$ and $C_4$ production reactions, and wherein said hydrogen-producing reactions are inhibited by the formation of carbonaceous deposits on said catalytic composite, the improvement which comprises contacting said charge stock, said hydrogen, and said catalytic composite with sulfur in an amount of from about 10 p.p.m. to about 5000 p.p.m. by weight of said charge stock, whereby the rate of formation of said carbonaceous deposits is decreased, and said hydrogen production is increased.

2. The process of claim 1 further characterized in that said crystalline aluminosilicate is in the hydrogen form.

3. The process of claim 1 further characterized in that said crystalline aluminosilicate is a mordenite type and said platinum group metal is selected from the group consisting of platinum and palladium.

4. The process of claim 3 further characterized in that said mordenite is present in the alumina matrix in a concentration of less than 20% by weight of said matrix, and said platinum group metal is present in a concentration of from about 0.05% to about 5.0% by weight of the catalytic composite.

5. The process of claim 1 further characterized in that said contacting is performed at operating conditions which include an LHSV of from about 0.5 to about 5.0, a temperature of from about 850° F. to about 1000° F., a pressure of from about 200 p.s.i.g. to about 700 p.s.i.g., and a hydrogen to oil mol ratio of from about 2 to about 20.

6. The process of claim 1 further characterized in that a reducible sulfur containing compound is added to said hydrocarbon charge stock in order to maintain the desired concentration of sulfur in said conversion zone.

7. The process of claim 1 further characterized in that at least a portion of said sulfur enters the conversion zone in the hydrogen gas.

8. The process of claim 1 further characterized in that said catalytic composite also contains a halogen component selected from the group consisting of chlorine and fluorine which is present in a concentration from about .05% to about 2.0% by weight of the catalytic composite.

9. The process of claim 1 further characterized in that said sulfur is present principally as hydrogen sulfide.

References Cited

UNITED STATES PATENTS

| 3,006,841 | 9/1953 | Haensel | 208—139 |
| 3,175,967 | 3/1965 | Miale et al. | 208—120 |
| 3,301,917 | 1/1967 | Wise | 208—138 |

HERBERT LEVINE, *Primary Examiner.*